United States Patent
Tafreshi et al.

(10) Patent No.: US 9,159,205 B1
(45) Date of Patent: Oct. 13, 2015

(54) TAMPER-EVIDENT SEALS HAVING ADHESIVE-FREE AREAS TO MINIMIZE REWORK TIME

(71) Applicant: Western Digital Technologies, Inc., Irvine, CA (US)

(72) Inventors: Shahriar A. Tafreshi, Fremont, CA (US); Yu-Min Lee, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/198,386

(22) Filed: Mar. 5, 2014

Related U.S. Application Data

(60) Provisional application No. 61/917,839, filed on Dec. 18, 2013.

(51) Int. Cl.
*G11B 33/12* (2006.01)
*G08B 5/00* (2006.01)

(52) U.S. Cl.
CPC ............... *G08B 5/00* (2013.01); *G11B 33/123* (2013.01)

(58) Field of Classification Search
CPC .............. G09F 3/10; G09F 2003/0225; G09F 2003/023; G09F 2003/0248; Y10T 428/14; Y10T 428/1476; G08B 5/00; G11B 33/121; G11B 33/122; G11B 33/123
USPC ................. 283/72, 74, 81; 427/207.1, 208.4, 427/208.6, 208.8; 428/40.1, 41.9, 42.1, 428/42.3, 343, 352; 360/97.11, 97.12, 360/99.15, 99.21, 99.23–99.25
See application file for complete search history.

(56) References Cited

U.S. PATENT DOCUMENTS

| | | | |
|---|---|---|---|
| 4,771,891 A * | 9/1988 | Sorensen et al. | 206/459.5 |
| 5,235,482 A | 8/1993 | Schmitz | |
| 5,665,445 A * | 9/1997 | Carney, Jr. | 428/40.1 |
| 5,731,058 A * | 3/1998 | Juso et al. | 428/156 |
| 5,770,288 A * | 6/1998 | Carney, Jr. | 428/40.1 |
| 5,860,235 A * | 1/1999 | Bilbie et al. | 40/299.01 |
| 6,046,889 A | 4/2000 | Berding et al. | |
| 6,052,890 A | 4/2000 | Malagrino, Jr. et al. | |
| 6,061,206 A | 5/2000 | Foisy et al. | |
| 6,101,876 A | 8/2000 | Brooks et al. | |
| 6,147,831 A | 11/2000 | Kennedy et al. | |
| 6,151,189 A | 11/2000 | Brooks | |
| 6,151,197 A | 11/2000 | Larson et al. | |
| 6,185,067 B1 | 2/2001 | Chamberlain | |
| 6,185,074 B1 | 2/2001 | Wang et al. | |
| 6,208,486 B1 | 3/2001 | Gustafson et al. | |
| 6,215,616 B1 | 4/2001 | Phan et al. | |
| 6,272,694 B1 | 8/2001 | Knoth | |

(Continued)

FOREIGN PATENT DOCUMENTS

| | | | |
|---|---|---|---|
| JP | 08030203 A | * | 2/1996 |
| JP | 2006127759 A | * | 5/2006 |
| JP | 2010049727 A | * | 3/2010 |

*Primary Examiner* — Will J Klimowicz

(57) ABSTRACT

Various aspects of the present disclosure provide tamper-evident seals and methods for indicating tampering with an apparatus using the tamper-evident seals. One such tamper-evident seal includes a base layer and a pattern-release layer on a periphery area of the base layer. In such case, the pattern-release layer includes a first adhesive configured to leave a residue on the printed circuit board assembly, and the base layer has a central area that is surrounded by the periphery area and free of the first adhesive.

35 Claims, 6 Drawing Sheets

(56) References Cited

U.S. PATENT DOCUMENTS

| | | |
|---|---|---|
| 6,288,866 B1 | 9/2001 | Butler et al. |
| 6,292,333 B1 | 9/2001 | Blumentritt et al. |
| 6,344,950 B1 | 2/2002 | Watson et al. |
| 6,349,464 B1 | 2/2002 | Codilian et al. |
| 6,388,873 B1 | 5/2002 | Brooks et al. |
| 6,417,979 B1 | 7/2002 | Patton, III et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,721,128 B1 | 4/2004 | Koizumi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,903,898 B2 * | 6/2005 | Nonaka et al. ............ 360/99.19 |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et al. |
| 7,215,513 B1 | 5/2007 | Chang et al. |

(56) References Cited

U.S. PATENT DOCUMENTS

| | | |
|---|---|---|
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,583 B2 * | 11/2007 | Miyazaki et al. .......... 360/99.23 |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,667,926 B2 * | 2/2010 | Naruse ....................... 360/97.19 |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,773,337 B2 | 8/2010 | Deeken |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,733 B2 | 3/2011 | Deeken |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,168,279 B2 * | 5/2012 | Schalk et al. ................ 428/40.1 |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,414,031 B2 * | 4/2013 | Hirose et al. .................... 283/81 |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 8,833,553 B2 * | 9/2014 | Corey et al. .................... 206/311 |
| 2002/0191331 A1 * | 12/2002 | Nonaka et al. ............. 360/97.01 |

(56) References Cited

U.S. PATENT DOCUMENTS

| | | | |
|---|---|---|---|
| 2003/0194523 A1* | 10/2003 | Kume et al. | 428/40.1 |
| 2005/0167311 A1 | 8/2005 | Tonsfeldt et al. | |
| 2006/0002005 A1 | 1/2006 | Miyazaki et al. | |
| 2007/0035872 A1 | 2/2007 | Hayakawa et al. | |
| 2010/0259037 A1 | 10/2010 | Hanrahan et al. | |
| 2011/0212281 A1 | 9/2011 | Jacoby et al. | |
| 2012/0164446 A1* | 6/2012 | Nakahira et al. | 428/354 |
| 2013/0038964 A1 | 2/2013 | Garbarino et al. | |
| 2013/0091698 A1 | 4/2013 | Banshak, Jr. et al. | |
| 2013/0155546 A1 | 6/2013 | Heo et al. | |
| 2013/0248403 A1* | 9/2013 | Li | 206/459.5 |
| 2013/0290988 A1 | 10/2013 | Watson et al. | |

* cited by examiner

TAMPER-EVIDENT SEALS HAVING ADHESIVE-FREE AREAS TO MINIMIZE REWORK TIME

CROSS-REFERENCE TO RELATED APPLICATION(S)

This application claims priority to and the benefit of U.S. Provisional Application No. 61/917,839 filed on Dec. 18, 2013 and entitled, "TAMPER EVIDENT ADHESIVE LABELS HAVING ADHESIVE FREE AREAS TO MINIMIZE REWORK TIME," the entire content of which is incorporated herein by reference.

BACKGROUND

The United States Federal Information Processing Standards (e.g., FIPS Publication 140-2) are published by the National Institute of Standards and Technology. To obtain FIPS certification of a secured device (e.g., a self-encrypting hard disk drive), the device may be protected against tampering and unauthorized access to its security function related components. For example, a self-encrypting hard disk drive's printed circuit board assembly (PCBA) and other components may be protected to prevent unauthorized access to circuit traces and the components. In addition, it is desirable to be able to detect any tampering that might have been attempted or occurred. In some applications, the entire exposed surface of a PCBA can be covered with a tamper-evident seal or label. When the seal is removed to gain access to the PCBA, a residue (tamper-evident) will be left behind on the surface of the PCBA. Therefore, the presence of the residue on the PCBA surface can serve as a tampering indication. However, the tamper-evident residue makes reworking the PCBA difficult and time consuming. More specifically, a considerable amount of time can be required to clean the PCBA surface of the residue before further rework is possible.

DETAILED DESCRIPTION

To comply with the United States Federal Information Processing Standards certification requirements (e.g., FIPS Publication 140-2), a tamper-evident seal or label can be placed on an exposed printed circuit board surface to secure the electronics and components. Once applied, removal of this seal will leave behind an adhesive residue pattern on the PCBA to indicate tampering and therefore make rework processes cumbersome due to extended cleaning time to remove all of the adhesive residue patterns from the printed circuit board.

Various embodiments of this invention are directed to an improved tamper-evident seal or label that can reduce or minimize the cleaning time during rework of a printed circuit board of a PCBA by introducing a residue-free zone at the center of the seal. In various embodiments, the residue-free zone may be an area that is substantially free of an adhesive that will leave a residue. Throughout this specification, the residue-free zone may be generally referred to as an adhesive-free area or zone. In addition, in some embodiments, the tamper-evident seal has one or more openings (e.g., air bleed vents, gas vents, slits) at suitable locations to prevent label bulging or blistering due to thermal expansion of trapped air in the adhesive-free zone. The addition of the adhesive-free zone may ease installation, minimize risk for the formation of creases, and potentially improve label installation yields. It is believed that such adhesive-free zones have not been used with tamper-evident label materials and have not been used for the purpose of reducing tamper-evident residue to minimize rework cleanup time. The security function of the seal is maintained using a tamper-evident adhesive located at the periphery of the seal, and the adhesive-free zone is located in the central area rather than at the periphery of the seal. The central area is free of an adhesive that will leave a residue as tampering evidence on a surface when a tamper-evident seal with such adhesive is removed from a surface. In one embodiment, the central area may be tacky or include an adhesive that leaves no residue.

In various embodiments, a tamper-evident seal may be used to indicate tampering of a hard disk drive by covering a printed circuit board assembly (PCBA) with the tamper-evident seal and/or other surfaces (outside surfaces) of the disk drive.

Figure 1A:
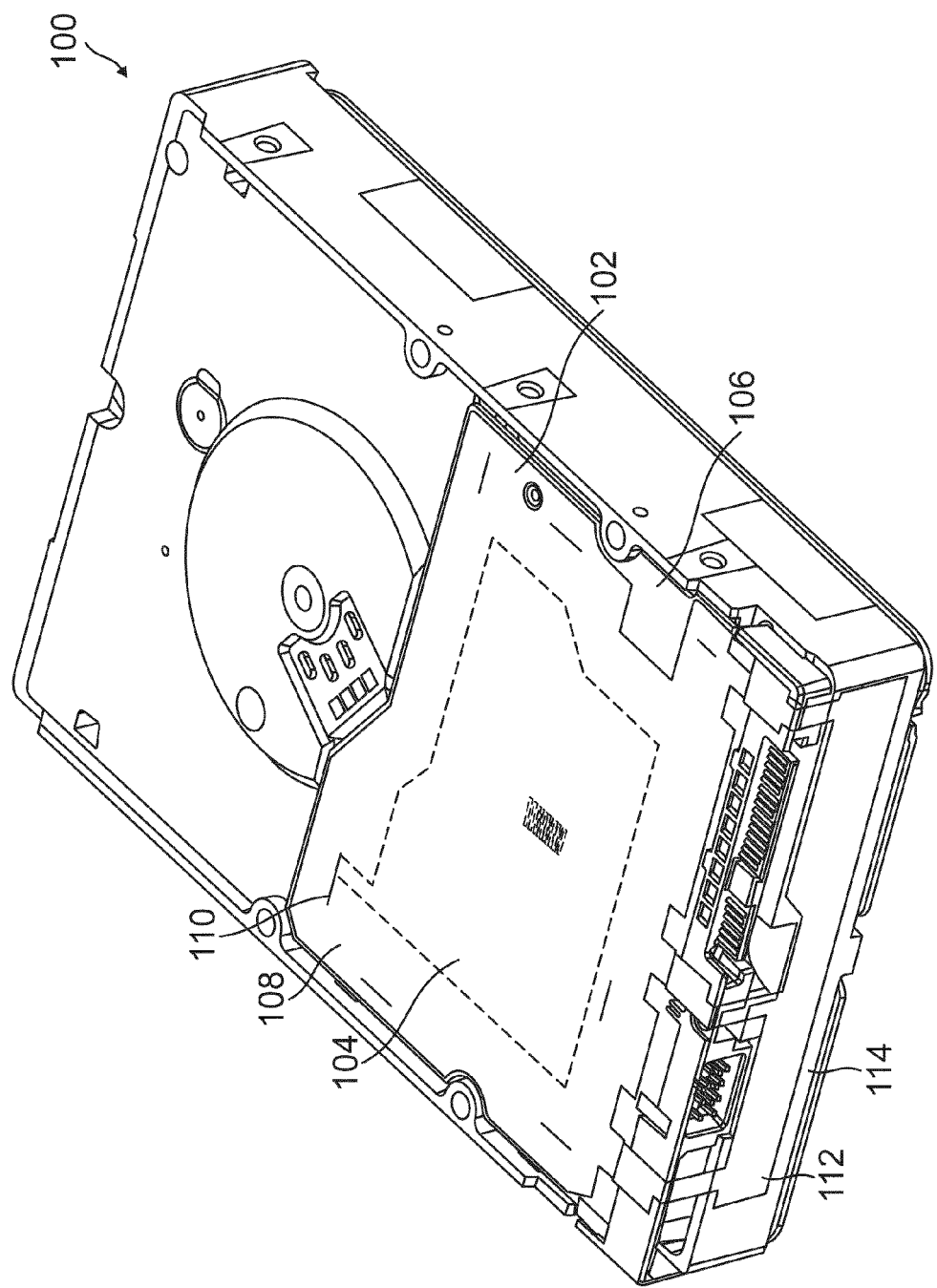
FIG. 1a and FIG. 1b illustrate two top perspective schematic views of a hard disk drive having a tamper-evident seal with an adhesive-free area installed on the drive in accordance with one embodiment of the invention.
Figure 1B:
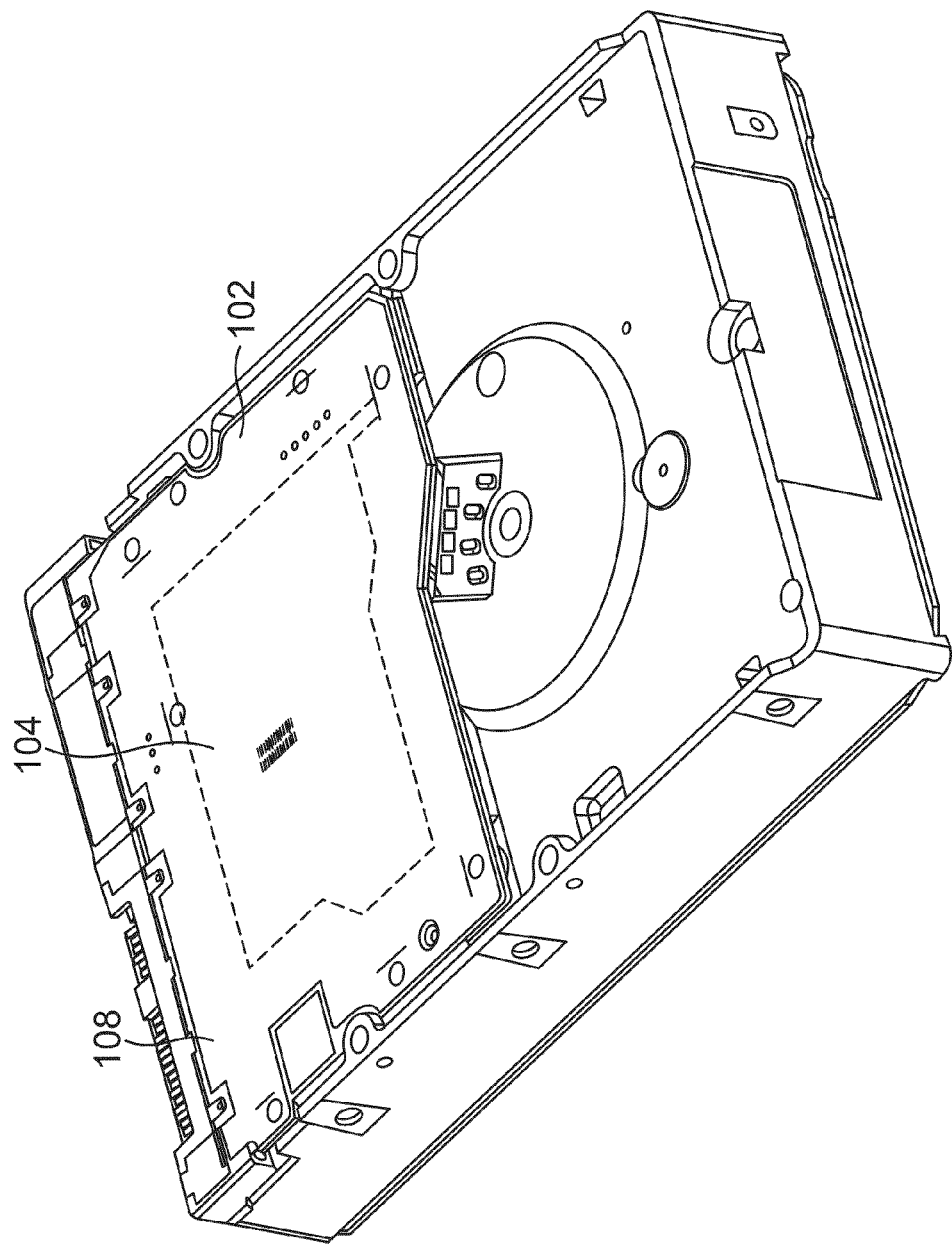

FIGS. 1a and 1b illustrate two top perspective schematic views of a hard disk drive 100 having a tamper-evident seal 102 with an adhesive-free area 104 (defined by the dashed boundary line in FIGS. 1a and 1b) installed on a PCBA 106 (mostly obscured by the seal 102 in FIG. 1) of the drive in accordance with one embodiment of the invention. The adhesive-free area 104 may be centrally located and is surrounded by a periphery area 108 that is an adhesive zone. When the seal 102 is removed or peeled off from the PCBA 106, a tamper-evident pattern (a residue) is left along a surface of the PCBA to indicate tampering. The tamper-evident seal 102 may have a folded portion 112 that is folded around an edge of the hard disk drive 100 and adhered to a surface 114 of the hard disk drive that is substantially perpendicular to the surface of the printed circuit board of the PCBA 106. The printed circuit board is a component of the hard disk drive and forms a portion of an outer cover of the hard disk drive.

The adhesive-free area 104 may have at least one opening 110 (e.g., air vent/gas vent/slit) at an outer area of the adhesive-free area 104 along a narrow channel. In some embodiments, the narrow channel allows the opening 110 for the adhesive-free area 104 to be positioned relatively close to the head of a screw (not visible) that secures the PCBA to the rest of the hard drive. Therefore, the opening 110 can provide access to the screw. One or more openings 110 may be positioned at any other suitable locations of the adhesive-free area 104.

Figure 2:
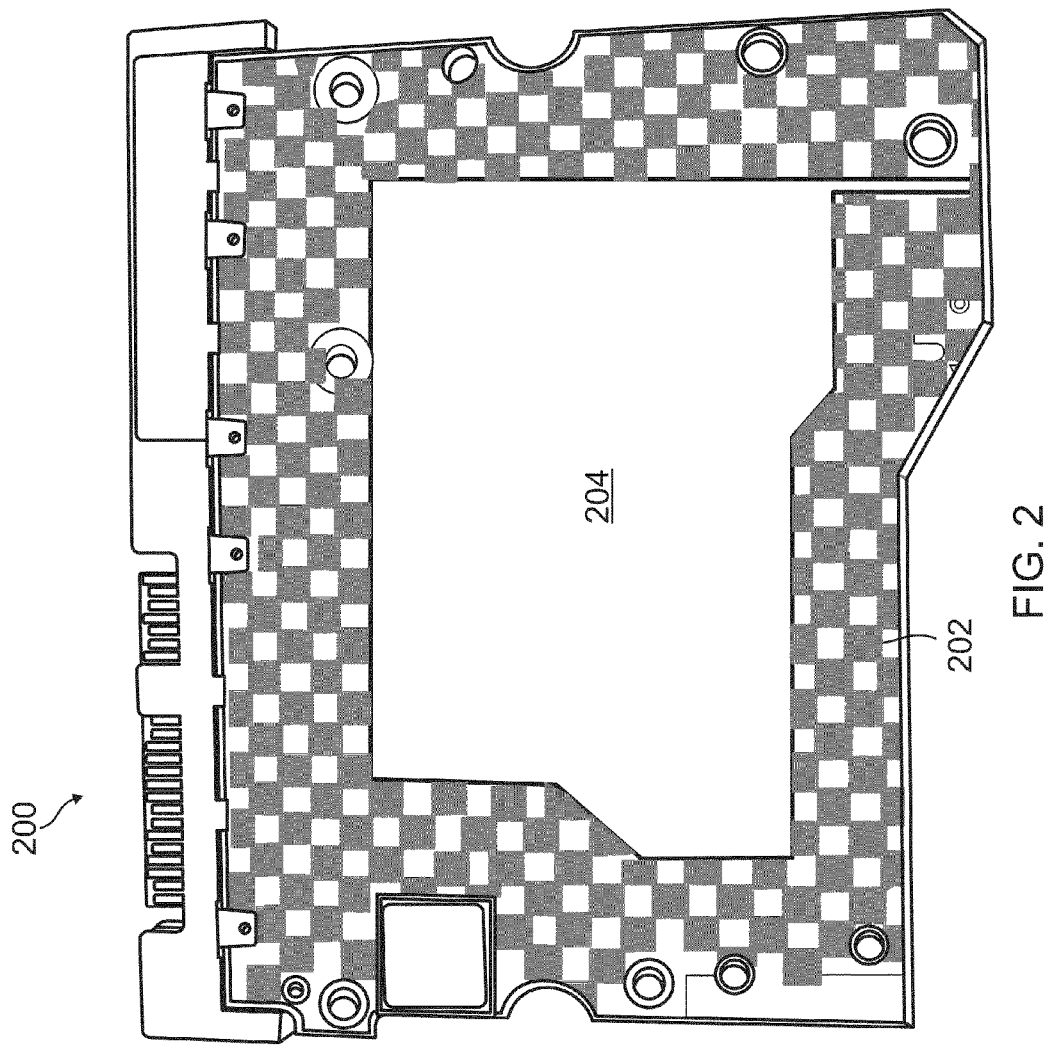
FIG. 2 is a top view of a printed circuit board assembly (PCBA) of a hard disk drive after a tamper-evident seal with an adhesive-free area was removed from the PCBA in accordance with one embodiment of the invention.

FIG. 2 is a top view of a schematic drawing depicting a printed circuit board assembly (PCBA) 200 of a hard disk drive after a tamper-evident seal with an adhesive-free area was removed from the PCBA 200 in accordance with one embodiment of the invention. The PCBA 200 may be the same as the PCBA 106 of FIG. 1. In several embodiments, a tamper-evident pattern 202 left on the PCBA 200 may have a checkerboard shape (checkered pattern) in the periphery area. As can be seen in FIG. 2, a checkerboard shaped residue with two or more rows of alternating blocks has been left in a grid like pattern in the periphery area of the PCBA 200. However, the central area 204 is free of adhesive or residue. Therefore, the time needed for reworking, which includes cleaning, the PCBA and the drive as a whole can be reduced. In other words, the improved tamper-evident seal can reduce or eliminate unessential adhesive residue left behind by the tamper-evident seal, and thereby reduce PCBA rework clean up time. In other embodiments, the tamper-evident pattern 202 may have any suitable pattern (e.g., a predetermined pattern) that surrounds the central area 204.

Figure 3:
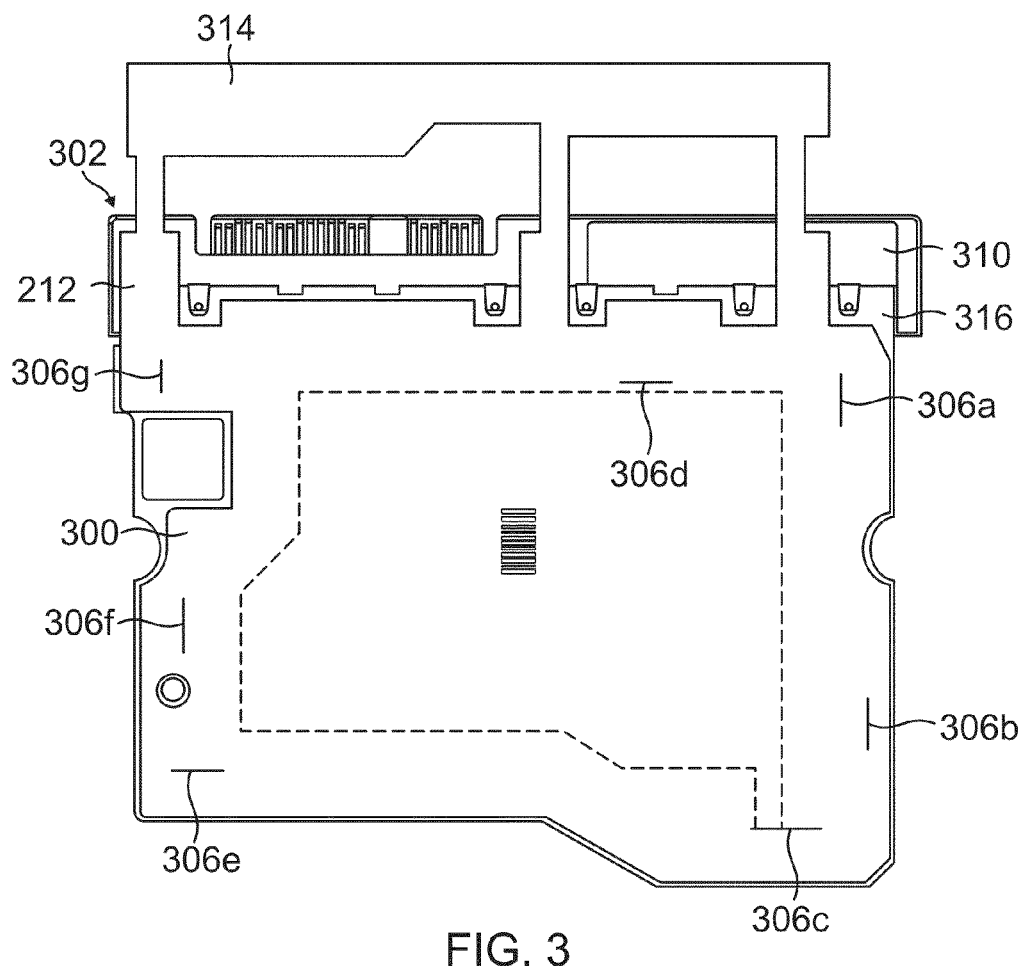
FIG. 3 is a top schematic view of a tamper-evident seal with an adhesive-free area installed on a printed circuit board assembly of a hard disk drive in accordance with one embodiment of the invention.

FIG. 3 is a top schematic view of a tamper-evident seal 300 with an adhesive-free area (not shown) installed on a printed circuit board assembly (PCBA) 302 in accordance with one embodiment of the invention. The PCBA 302 may be a component of a hard disk drive.

Figure 4:
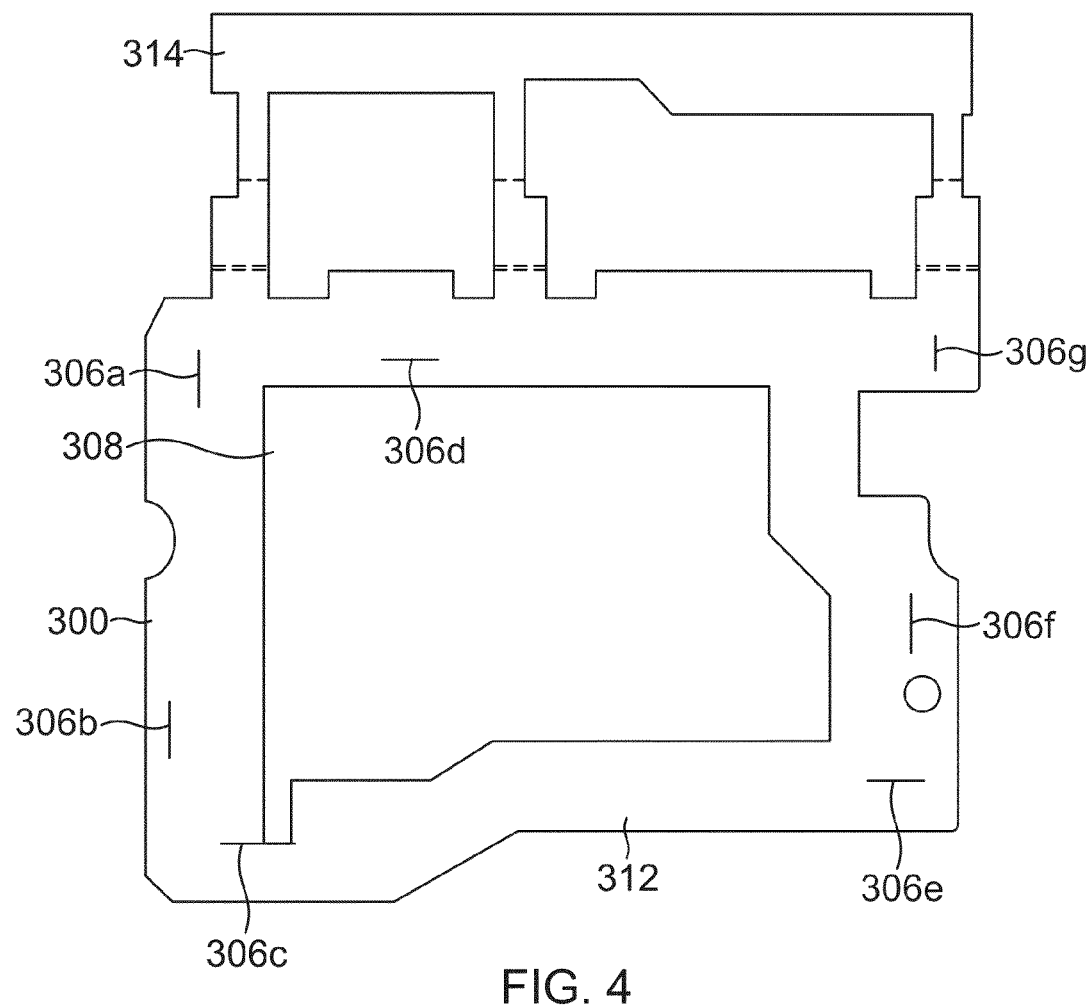
FIG. 4 is a top schematic view of the tamper-evident seal of FIG. 3 with the adhesive-free area in accordance with one embodiment of the invention.

FIG. 4 is a top schematic view of the tamper-evident seal 300 of FIG. 3 with an adhesive free-area 308 in accordance with one embodiment of the invention.

Referring now to both FIGS. 3 and 4, in some embodiments, the tamper-evident seal 300 may be the same as the tamper-evident seal 102 of FIG. 1, and the PCBA 302 may be the PCBA 106 of FIG. 1. In some embodiments, the tamper-evident seal 300 may have more than one opening 306 (e.g., gas vents/slits 306a through 306g) and/or have them positioned in areas in the central area, periphery area, or other suitable areas of the seal 300 besides those depicted in FIG. 3. For example, the opening 306d is positioned along an edge of an adhesive-free area 308 (see FIG. 4) close to a drive connector interface 310, and while not actually within the adhesive-free area 308, it can allow some air or gas to escape from the adhesive-free area.

In a number of embodiments, the size of the adhesive-free area 308 of the tamper-evident seal 300 can be maximized to reduce PCBA rework cleaning while still maintaining a suitably sized periphery area 312 with adhesive to ensure that the security functionality of the seal remains. The periphery area 312, similar to the periphery area 108 of FIG. 1, is sufficiently large to allow for a tamper-evident pattern to be produced when the seal is removed from the PCBA 302. In some embodiments, the tamer-evident pattern has a minimum of about two or more rows of a checkerboard pattern as shown in FIG. 2, for example. In the embodiment illustrated in FIG. 4, the adhesive-free area 308 has a shape that is about rectangular. In other embodiments, the adhesive-free area 308 can have other suitable shapes and other suitable sizes. In some embodiments, simple shapes can be useful to avoid complexity in the formation of the tamper-evident seal with the adhesive-free area.

In a number of embodiments, a portion of the tamper-evident seal 300 is adhered to the surface of a printed circuit board 316 of the PCBA 302, and another portion 314 (folded portion) is folded around an edge of the hard disk drive (see, e.g., FIG. 1) and adhered to a surface of the hard disk drive that is substantially perpendicular to the surface of the PCB 316. The folded portion 314 can prevent or discourage tampering with components located inside of the hard disk drive. In addition, the folded portion 314 can prevent or discourage tampering with at least one connector (e.g., connector 310) located along the surface of the hard disk drive.

Figure 5:
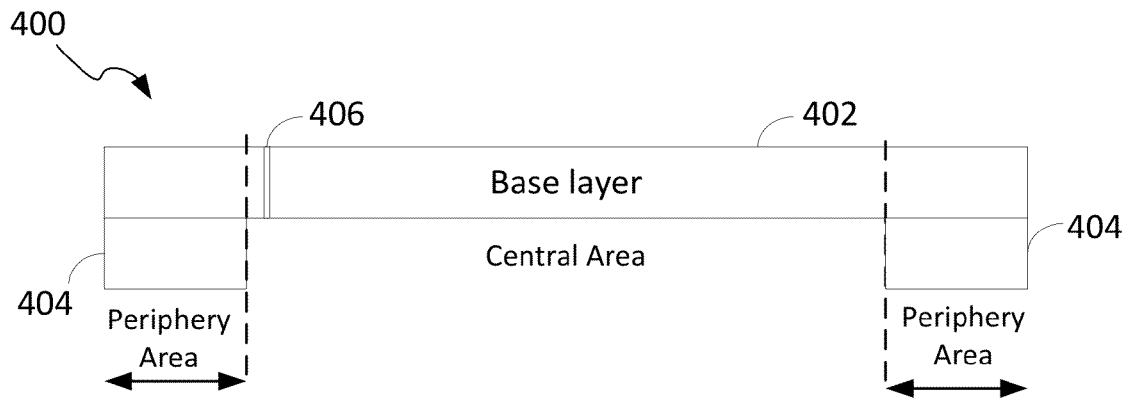
FIG. 5 is a cross sectional schematic view of a tamper-evident seal with an adhesive-free central area in accordance with an embodiment of the invention.

FIG. 5 is a cross sectional schematic view of a tamper-evident seal 400 with an adhesive-free central area in accordance with an embodiment of the invention. In several embodiments, the tamper-evident seal 400 may be used as the tamper-evident seals illustrated in FIGS. 1, 3 and 4. Note that the seal 400 is not drawn to actual scale. The tamper-evident seal 400 includes a base layer 402 and a pattern-release layer 404 on a periphery area of the base layer 402. The pattern-release layer 404 may have an adhesive or a sticky/tacky property so that the tamper-evident seal 400 can be adhered to the surface of a printed circuit board or other surfaces. When the seal 400 is removed from the printed circuit board (PCB), the pattern-release layer 404 leaves a tamper-evident pattern (e.g., see FIG. 2) on the surface of the PCB. The base layer 402 has a central area (e.g., area 104 of FIG. 1 and area 308 of FIG. 4) that is surrounded by the periphery area and free of the adhesive. In some embodiments, the central area may include at least one opening 406 (e.g., air vents/slits) to release gas trapped between the seal and the surface of the PCB through the opening 406 in the central area of the seal. In several embodiments, the tamper-evident seal 400 is made of one or more materials that are completely or about opaque.

In some embodiments, the tamper-evident seal 400 can be formed by starting with a pattern-release layer 404 that covers both the central area and the periphery area of the base layer 402. Then, a suitable method may be used to make the portion of the pattern-release layer 404 located in the central area non-sticky or adhesive-free. For example, in one embodiment, the portion of the pattern-release layer corresponding to the central area may be printed with a suitable ink or paint to make it non-sticky or non-tacky.

Figure 6:
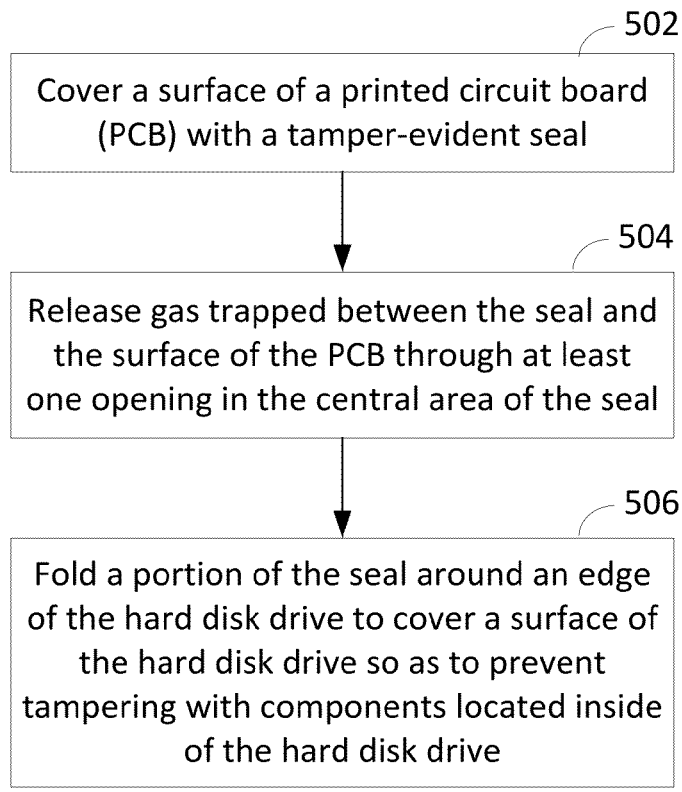
FIG. 6 is a flowchart illustrating a method of indicating tampering using a tamper-evident seal with an adhesive-free area installed on a printed circuit board assembly including a printed circuit board in accordance with an embodiment of the invention.

FIG. 6 is a flowchart illustrating a method of indicating tampering with a printed circuit board assembly (PCBA) including a printed circuit board (PCB) in accordance with an embodiment of the invention. The PCBA may be a component of a hard disk drive 100 illustrated in FIG. 1. In block 502, a surface of the PCB is covered with a tamper-evident seal, which will leave a tamper-evident pattern on the surface of the PCB when the seal is removed. In an embodiment of the disclosure, the tamper-evident seal may be any of the tamper-evident seals illustrated in FIGS. 1 and 3-5. In block 504, the method may optionally include releasing gas trapped between the seal and the surface of the PCB through at least one opening in the central area of the seal. In block 506, the method may optionally include folding a portion (e.g., portion 112 of FIG. 1) of the seal around an edge of the hard disk drive to cover a surface (e.g., surface 114 of FIG. 1) of the hard disk drive so as to prevent tampering with components located inside of the hard disk drive. In order to rework the PCBA, the seal is removed, and the residue corresponding to the tamper-evident pattern is removed from a periphery area of the PCB. Because no tamper-evident residue is left in the central area of the printed circuit board, no cleaning is needed.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A tamper-evident seal for indicating tampering with a printed circuit board assembly, the tamper-evident seal comprising:
    a base layer;
    a pattern-release layer on a periphery area of the base layer; and
    a central area of the base layer having a perimeter defined by the periphery area,
    wherein the pattern-release layer comprises a first adhesive configured to leave a residue on the printed circuit board assembly, and
    wherein the central area is free of adhesive.

2. The tamper-evident seal of claim 1, wherein the central area comprises at least one opening.

3. The tamper-evident seal of claim 2, wherein the at least one opening comprises a gas vent.

4. The tamper-evident seal of claim 2, wherein the at least one opening is configured to release gas trapped between the tamper-evident seal and a surface to which the tamper-evident seal is adhered.

5. The tamper-evident seal of claim 2, wherein the periphery area comprises at least one opening.

6. The tamper-evident seal of claim 1, wherein the pattern-release layer is configured to produce a tamper-evident pattern when the tamper-evident seal is removed from a surface to which the tamper-evident seal is adhered to by the first adhesive.

7. The tamper-evident seal of claim 6, wherein the tamper-evident pattern comprises a predetermined pattern.

8. The tamper-evident seal of claim 6, wherein the tamper-evident pattern comprises a checkered pattern or two or more rows of alternating blocks.

9. The tamper-evident seal of claim 1, wherein the first adhesive is configured to leave a residue on the printed circuit board assembly throughout the periphery area of the base layer.

10. A printed circuit board assembly comprising:
    a printed circuit board (PCB); and
    a tamper-evident seal adhered to a surface of the PCB, comprising:
        a base layer;
        a pattern-release layer on a periphery area of the base layer; and
        a central area of the base layer having a perimeter defined by the periphery area,
        wherein the pattern-release layer comprises a first adhesive configured to leave a residue on the printed circuit board assembly, and
        wherein the central area is free of adhesive.

11. The printed circuit board assembly of claim 10, wherein the central area comprises at least one opening.

12. The printed circuit board assembly of claim 11, wherein the at least one opening comprises a gas vent.

13. The printed circuit board assembly of claim 10, wherein the PCB is a component of a hard disk drive and forms a portion of an outer cover of the hard disk drive.

14. The printed circuit board assembly of claim 13, wherein the tamper-evident seal comprises a first portion adhered to the surface of the PCB, and a second portion folded around an edge of the hard disk drive and adhered to a surface of the hard disk drive that is substantially perpendicular to the surface of the PCB.

15. The printed circuit board assembly of claim 14, wherein the second portion is configured to prevent tampering with components located inside of the hard disk drive.

16. The printed circuit board assembly of claim 14, wherein the second portion is configured to prevent tampering with at least one connector located along the surface of the hard disk drive.

17. The printed circuit board assembly of claim 10, wherein the first adhesive is configured to leave a residue on the printed circuit board assembly throughout the periphery area of the base layer.

18. A method of indicating tampering with a printed circuit board assembly comprising a printed circuit board (PCB), comprising:
    covering a surface of the PCB with a tamper-evident seal, wherein the tamper-evident seal comprises:
        a base layer;
        a pattern-release layer on a periphery area of the base layer; and
        a central area of the base layer having a perimeter defined by the periphery area,
        wherein the pattern-release layer comprises a first adhesive configured to leave a residue on the printed circuit board assembly,
    wherein the central area is free of adhesive, and
    wherein the pattern-release layer is configured to leave a tamper-evident pattern on the surface of the PCB when the seal is removed.

19. The method of claim 18, further comprising releasing gas trapped between the seal and the surface of the PCB through at least one opening in the central area of the seal.

20. The method of claim 19, wherein the at least one opening comprises a gas vent.

21. The method of claim 18,
    wherein the PCB is a component of a hard disk drive and forms a portion of an outer cover of the hard disk drive, further comprising:
    folding a portion of the seal around an edge of the hard disk drive to cover a surface of the hard disk drive so as to prevent tampering with components located inside of the hard disk drive.

22. The method of claim 18, further comprising:
    removing the tamper-evident seal; and
    removing a residue corresponding to the tamper-evident pattern from a periphery area of the PCB.

23. The method of claim 18, wherein the first adhesive is configured to leave a residue on the printed circuit board assembly throughout the periphery area of the base layer.

24. A tamper-evident seal for indicating tampering with a printed circuit board assembly, the tamper-evident seal comprising:
    a base layer;
    a pattern-release layer on a periphery area of the base layer; and
    a central area of the base layer having a perimeter defined by the periphery area, wherein the pattern-release layer comprises a first adhesive configured to leave a residue on the printed circuit board assembly, and wherein the central area comprises a second adhesive configured to leave no residue on the printed circuit board assembly.

25. The tamper-evident seal of claim 24, wherein the pattern-release layer is configured to produce a tamper-evident pattern when the tamper-evident seal is removed from a surface to which the tamper-evident seal is adhered to by the first adhesive.

26. The tamper-evident seal of claim 25, wherein the tamper-evident pattern comprises a predetermined pattern.

27. The tamper-evident seal of claim 25, wherein the tamper-evident pattern comprises a checkered pattern or two or more rows of alternating blocks.

28. A printed circuit board assembly comprising:
a printed circuit board (PCB); and
a tamper-evident seal adhered to a surface of the PCB, comprising:
   a base layer;
   a pattern-release layer on a periphery area of the base layer; and
   a central area of the base layer having a perimeter defined by the periphery area,
   wherein the pattern-release layer comprises a first adhesive configured to leave a residue on the printed circuit board assembly, and
      wherein the central area comprises a second adhesive configured to leave no residue on the printed circuit board assembly.

29. The printed circuit board assembly of claim 28, wherein the PCB is a component of a hard disk drive and forms a portion of an outer cover of the hard disk drive.

30. The printed circuit board assembly of claim 29, wherein the tamper-evident seal comprises a first portion adhered to the surface of the PCB, and a second portion folded around an edge of the hard disk drive and adhered to a surface of the hard disk drive that is substantially perpendicular to the surface of the PCB.

31. The printed circuit board assembly of claim 30, wherein the second portion is configured to prevent tampering with components located inside of the hard disk drive.

32. The printed circuit board assembly of claim 30, wherein the second portion is configured to prevent tampering with at least one connector located along the surface of the hard disk drive.

33. A method of indicating tampering with a printed circuit board assembly comprising a printed circuit board (PCB), comprising:
covering a surface of the PCB with a tamper-evident seal, wherein the tamper-evident seal comprises:
   a base layer;
   a pattern-release layer on a periphery area of the base layer; and
   a central area of the base layer having a perimeter defined by the periphery area,
   wherein the pattern-release layer comprises a first adhesive configured to leave a residue on the printed circuit board assembly,
wherein the central area comprises a second adhesive configured to leave no residue on the printed circuit board assembly, and
wherein the pattern-release layer is configured to leave a tamper-evident pattern on the surface of the PCB when the seal is removed.

34. The method of claim 33,
wherein the PCB is a component of a hard disk drive and forms a portion of an outer cover of the hard disk drive, further comprising:
folding a portion of the seal around an edge of the hard disk drive to cover a surface of the hard disk drive so as to prevent tampering with components located inside of the hard disk drive.

35. The method of claim 34, further comprising:
removing the tamper-evident seal; and
removing a residue corresponding to the tamper-evident pattern from a periphery area of the PCB.

* * * * *